United States Patent [19]

Heldmann et al.

[11] 3,920,060
[45] Nov. 18, 1975

[54] CUP-POINT FASTENER

[75] Inventors: Ernest J. Heldmann, Wethersfield; Terry D. Capuano, Newington, both of Conn.

[73] Assignee: Veeder Industries, Inc., Hartford, Conn.

[22] Filed: July 11, 1973

[21] Appl. No.: 378,145

[52] U.S. Cl. .................................. 151/70; 85/1 SS
[51] Int. Cl.² ..................... F16B 39/282; F16B 35/04
[58] Field of Search ............... 151/70; 85/1 SS, 30; 403/362

[56] References Cited
UNITED STATES PATENTS

| | | | |
|---|---|---|---|
| 1,247,356 | 11/1917 | Wooden | 85/1 SS |
| 1,523,932 | 1/1925 | Davies | 85/1 SS |
| 2,778,265 | 1/1957 | Brown | 151/70 |
| 2,992,669 | 7/1961 | Fesmire | 151/70 |

*Primary Examiner*—Edward C. Allen

[57] ABSTRACT

A cup-point fastener for increased penetration, improved holding power, greater resistance to loosening and more consistant performance when reused, the cup-point having a downwardly and inwardly curving outer flank and a downwardly and outwardly sloping inner flank which meet and terminate in a surface engaging and penetrating edge extending circularly around and spaced radially outwardly from the vertical axis of the pin, the flanks forming therebetween a wedge extending upwardly from the edge, the thickness of the portion of the wedge on the vertical pin axis side of a line passing through the edge and the wedge and parallel to the vertical pin axis at the edge end of the cup-point being less than the thickness of the wedge portion on the opposite side of the line, the ratio of the differences between the wedge portion thickness progressively decreasing from the edge to a plane passing through the cup-point at a distance 20% of the diameter of the cup-point, in which plane, the portions of the wedge on the opposite sides of the line are substantially equal.

7 Claims, 8 Drawing Figures

CUP-POINT FASTENER

This invention relates to fastener pins of the cup-point type and more particularly to improvements in the shape and configuration of the cup-point which provides unique and unexpected operating characteristics.

Cup-point fasteners are used in many applications. For example, such fasteners are used as pins or set screws for fastening two or more elements, such as shafts and collars or pulleys, against movement relative to each other. The cup-point fastener prevents relative longitudinal and rotational movement between the shaft and the attached member.

In its most common form, the cup-point fastener is in the form of a set screw, threaded along its periphery and provided, at one of its ends, with a screw driver slot or male or female attachment for a wrench or other suitable driving means. At its opposite end, the fastener is provided with a cup, opening downwardly of the screw and forming a downwardly facing sharp edge around and spaced radially from the axial center line of the fastener. One of the members is fastened, for example a collar or pulley, is provided with a threaded hole into which the set screw is to be driven, the threaded hole being open, at its opposite end against the member, such as a shaft, to which the collar or pulley is to be fastened. The set screw is threaded into and through the threaded hole so that the cup point bites into and penetrates the surface of the shaft. This biting and penetration into the shaft increases the holding power of the fastener. As compared to a set screw with a flat point, the cup point set screw has greater resistance to relative movement longitudinally and rotationally between the members so fastened.

The cup sides, extending upwardly from the sharp edge and spaced radially around the fastener center line, are wedge-shaped. As the sharp edge bites into and penetrates the shaft, the wedge-shaped cup sides, as they enter the metal of the shaft, force the metal to flow inwardly on one side of the wedge into the cup center and outwardly on the other side of the wedge. As the sharp edge bites and penetrates further into the shaft, more of the shaft metal must be forced to flow inwardly and outwardly.

The wedge-shaped cup sides must, of course, be of sufficient strength to cause the metal of the shaft to flow and to resist deformation of the cup. The standard cup-point fastener has an included angle between the inner cup flanks of 118° and an external angle at the outer cup flank of 45°. Thus, the angle between the inner and outer cup flanks forming the wedge extending upwardly from the sharp edge is 104°. Relative to a line drawn from the sharp edge upwardly through the wedge formed by the flanks and parallel to the centerline of the fastener or set-screw, 59° of the wedge angle is on the cup center side of the line and the remaining 45° is on the outer side of such line.

One of the difficulties with the standard 104° wedge cup point is that, because of the width or thickness of the wedge formed by the flanks, substantial resistance to further biting and penetration of the cup into the metal of the shaft occurs soon after the sharp edge commences penetration. The wide wedge tends to compress the metal of the shaft rather than cause such metal to flow. When used on a round shaft, rather than biting into and penetrating the metal of the shaft for the full circumference of the cup, such standard cup points tend to bite into and penetrate at the crown of the round shaft. After this occurs, the resistance to further biting and further penetration increases so rapidly that further penetration to assure circumferential biting and penetration is not possible, especially with shafts of harder metals. Thus, full advantage of the cup point is lost.

In an effort to increase shaft penetration and increase circumferential biting and penetration into the shaft, the wedge angle of the cup flanks has been decreased to 60°. While this has reduced resistance to further biting and penetration of the cup into the metal of the shaft and has increased circumferential biting and penetration of the cup-point into the shaft, compression of the shaft metal and increased resistance to driving still occurs as the 60° wedge angle cup penetrates further into the metal. This 60° wedge angle cup sacrifices the cup strength. Thus, the use of this cup point is limited to softer shaft materials.

The object of the instant invention is a point that achieves the greatest penetration in common shafting by having the sharpest wedge shape possible without sacrificing the structural strength of the point, as is the case with the 60° and other linear sided sharp wedge points. This is achieved by a nonsymetrical wedge, shaped to balance the higher compressive force from within the cup, which tend to cause the point to mushroom outward, with the relatively smaller inward forces on the outside of the cup. By curving the outside of the wedge, a side shape is formed that is more nearly perpendicular to the applied service load when at full penetration. This reduces the component of the service load, parallel to the fastener axis, which tend to separate the assembled members, as in prior art linear sided points.

The present invention will be more fully described and better understood from the following description and appended drawings showing the preferred embodiment and in which FIG. 1 is an enlarged sectional view showing a standard cup-point during the initial stage of the penetration of the point into a shaft;

Figure 1:
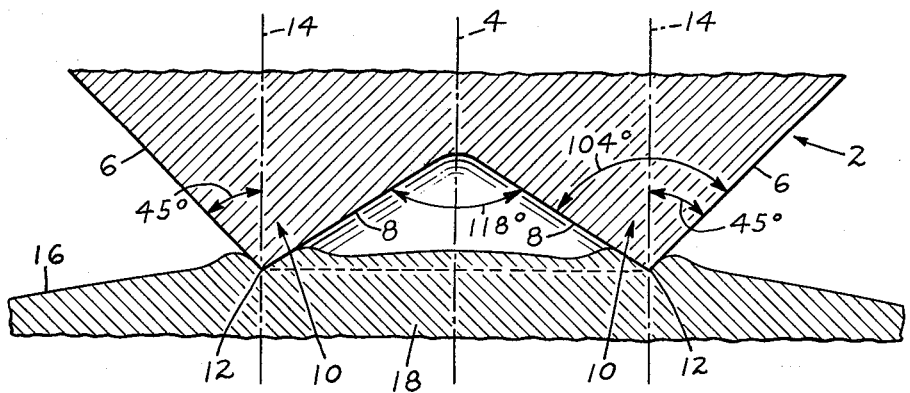
Figure 2:
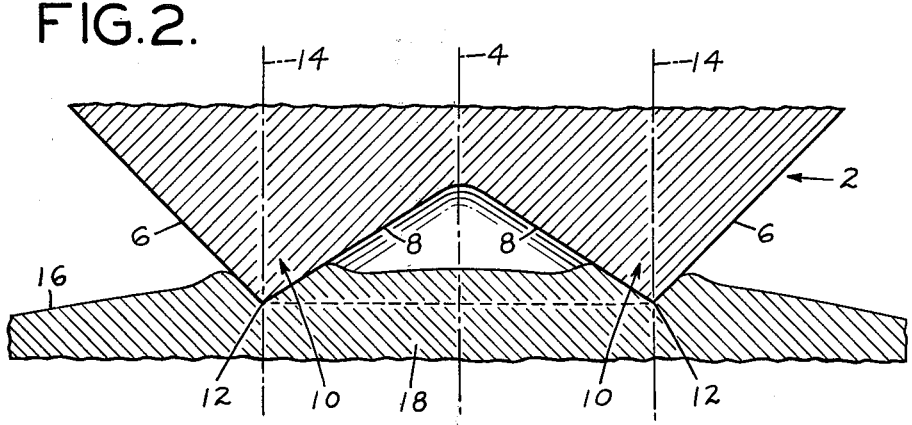
FIG. 2 is a view similar to FIG. 1 but showing the cup-point during the final stage of penetration into the shaft.

Referring to the drawings, the cup-point of FIGS. 1 and 2 is representative of standard cup-points. As shown in FIG. 1, such cup-points include a cup, generally designated 2, concentrically formed around the centerline 4 of the fastener. Outer cup flank 6 and inner cup flank 8 form therebetween wedge 10. At the lower or driving edge of wedge 10, flanks 6 and 8 join to form edge 12. In such cup-point, the included angle between inner cup flanks 8,8, in the hollow center of the cup, is 118°. The angle of outer cup wall 6, relative to centerline 14 passing upwardly through edge 12 and wedge 10 and parallel to centerline 4 is 45°. Thus, the wedge angle between cup flanks 6, 8 is 104°.

As shown in FIG. 1, edge 12 of wedge 10 of cup-point 2 has entered and is penetrating into surface 16 of shaft 18. Because of the relatively wide angle between flanks 6,8 of wedge 10, while the edge 12 is attempting to part, separate and cause the metal to cold flow outwardly, inwardly moving side walls 6, 8 tend to compress and force the shaft metal downwardly and resist and oppose the outward cold flow of the metal. As best shown in FIG. 2, this compression of the shaft metal by the relatively wide angled and relatively flat side flanks builds up and increases rather rapidly as penetration of the cup-point continues. Not only is the compressive force applied to the shaft metal in the area undergoing deeper penetration but a similar and like compressive force is applied to the metal displaced and which has been caused to cold flow along flanks 6, 8. Hence, with relatively shallow penetration, the compressive and resistive forces reach sufficient magnitude so that further penetration of the cup-point into the shaft surface is prevented. Particularly with shafts of smaller diameter, often times penetration of the cup-point for the full circumference of the point is not attained.

Figure 3:
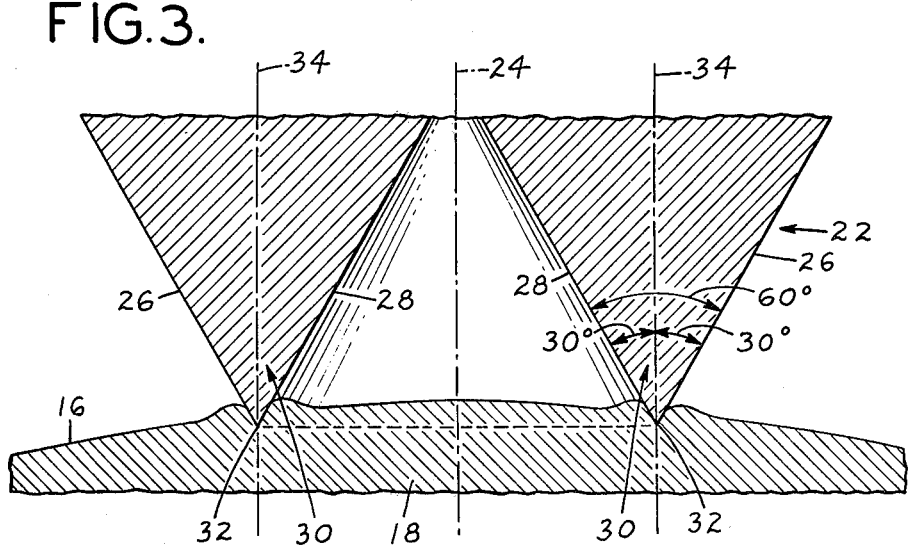
FIG. 3 is a view similar to FIG. 1 but showing a prior art cup-point in which the angular cup-point wedge is of reduced angle and thickness.

The cup-point of FIG. 3 is representative of standard cup-points in which the wedge angle between the cup flanks is reduced. As shown in FIG. 3, the cup, generally designated 22, is concentrically formed around centerline 24 of the fastener. Outer cup flank 26 and inner cup flank 28 form therebetween wedge 30. At the lower or driving edge of wedge 30, flanks 26, 28 join, as in the standard cup-point, to form edge 32. The included angle between inner cup flanks 28, 28 is 60°. The angles of outer cup flank 26 and inner cup flank 28, relative to centerline 34 passing upwardly through edge 32 and wedge 30 and parallel to centerline 14, are both 30°. Hence, the wedge angle between cup flanks 26, 28 is 60°. However, because of the symmetry of this wedge shape an unbalanced outward force results from the compressive force from inside the cup. This is due to the shaft material inside the cup being confined and not being allowed to flow as freely as the material on the outside of the cup. On the harder materials commonly used for shafting, this unbalance force tends to cause this point to mushroom outwardly.

Another condition influencing the unbalance of forces and hence the mushrooming is the curvature of the shaft. When the relation between the shaft and point diameters is small, as is the case in large numbers of assemblies in which set screws are applied, these unbalanced forces are accentuated and are greater in the plane of the shaft axis than they are in the plane perpendicular to the shaft axis. The mushrooming which results distorts the cup so that it is no longer circular and the wedge is flattened. This distortion reduces the penetration and holding power of the point, especially when it is reused after once being applied and disassembled.

As can be seen from FIGS. 1, 2 and 3, the wedge angle between cup flanks 26, 28 in the cup-point of FIG. 3 is smaller than that of FIGS. 1 and 2. The smaller wedge angle tends to reduce the compression forces applied to the shaft metal as edges 32 bites into and penetrates the shaft metal at the surface but compressive forces similar to those encountered with the standard cup-point of FIGS. 1 and 2 occur. While the reduced compression forces of the cup-point of FIG. 3 allow for deeper penetration, with the same force applied, than does the cup-point of FIGS. 1 and 2, nevertheless, compressive and resistive forces do build up and reach a magnitude where further penetration of the cup-point into the shaft surface is prevented.

Figure 4:
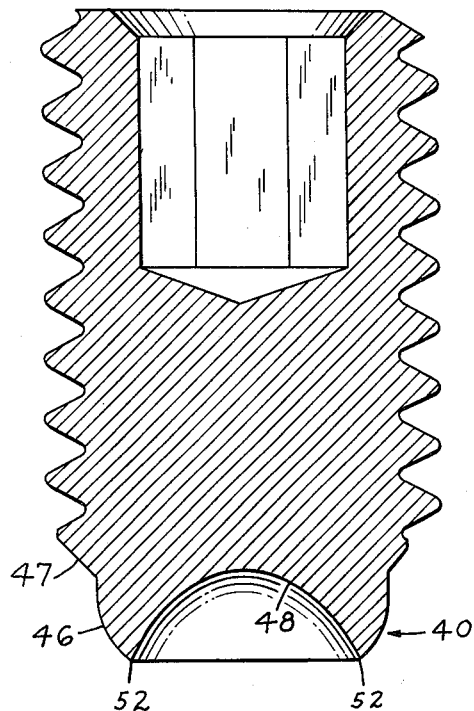
FIG. 4 is a cross-sectional view of a set-screw embodiment of the cup-point fastener of the instant invention.
Figure 5:
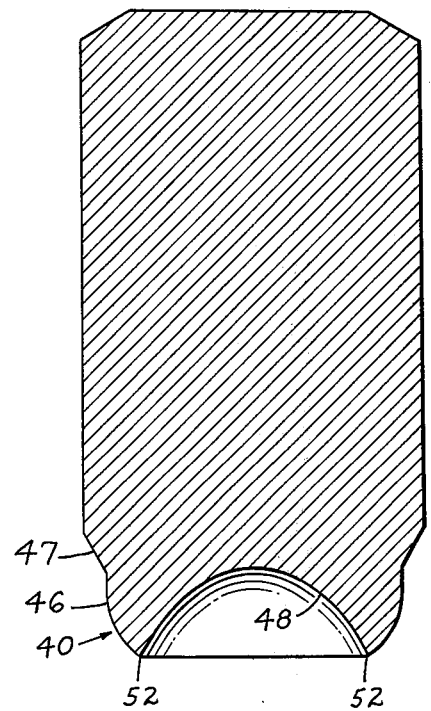
FIG. 5 is a cross-sectional view similar to FIG. 4 but showing a pin fastener embodiment of the invention.

The cup-point fastener of the instant invention is shown in FIG. 4 as applied to a threaded set-screw and in FIG. 5 as applied to an unthreaded pin. In both embodiments, the cup-point, generally designated 40 in FIGS. 4 and 5, is of the same configuration and will be described with reference to FIGS. 6, 7 and 8, where the cup-point, and the configuration thereof, are shown in enlarged detail.

Figure 6:
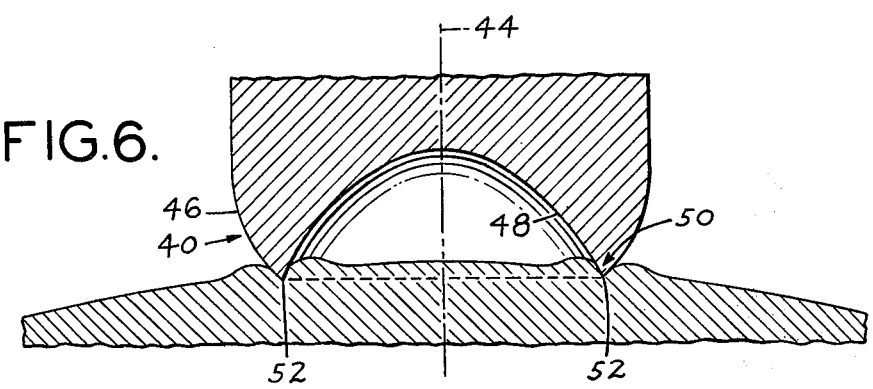
FIG. 6 is a view, similar to FIG. 1, but showing the cup-point of the instant invention during the initial stage of penetration.
Figure 7:
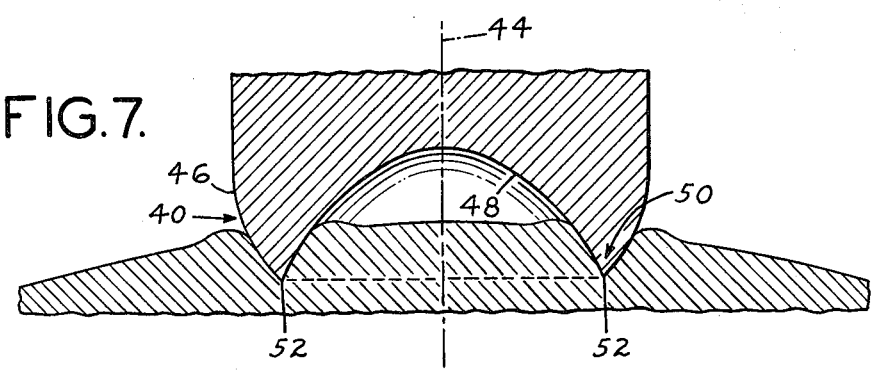
FIG. 7 is a view of the cup-point of FIG. 6 during the final stage of penetration.

Referring to FIGS. 6 and 7, cup-point 40 of the instant invention includes a cup concentrically formed around centerline 44 of the fastener. Outer cup flank 46 curves downwardly and inwardly with respect to centerline 44, and toward the cup-point. Inner cup flank 48 slopes downwardly and outwardly with respect to centerline 44 and toward the cup point. Outer flank 46 and inner flank 48 form therebetween wedge 50 terminating at the lower end, where flanks 46, 48 meet, in edge 52 thereby forming the cup-point. Preferably, in the instant invention, inner cup flank 48, in sloping downwardly and outwardly, curves slightly outwardly to form a slightly concaved surface relative to centerline 44. The curvature of outer cup flank 46 is convex relative to centerline 44.

The size of cup-point diameters or size of the cup opening, measured across the cup at the tip or lower edge of the cup, varies in standard cup-point fasteners, such as, for example, in USA STANDARD B18.3-1969. For example, in standard cup-point fasteners or set-screws having a nominal size or base screw diameter of ½ or 0.500 inches, in one standard the cup diameter varies between a maximum of 0.291 inches and a minimum of 0.270 inches. Another standard cup diameter varies between a maximum of 0.250 inches and a minimum of 0.235 inches. Still another standard cup diameter varies between a maximum of 0.333 inches and a minimum of 0.328 inches. It is to be understood that, in the practice of the instant invention, the size of the cup-point diameter may be any of the standard sizes or of a different size. In order to attain sufficient penetration, the height of the cup, measured along the centerline of the fastener and measured from the plane of the cup opening should be no less than 0.25 times the diameter of such opening.

In the instant invention, the thickness of the wedge formed by outer and inner flanks 46, 48 of the cup is proportional so that, from a plane parallel to and spaced a distance approximately 20% of the opening diameter from the plane of the cup opening, the width or thickness of wedge 50 decreases proportionately. Such decrease in wedge thickness, and the slope and positioning of inner flank 48 relative to the center line of the cup-point, determines the curvature of outer flank 46.

Figure 8:
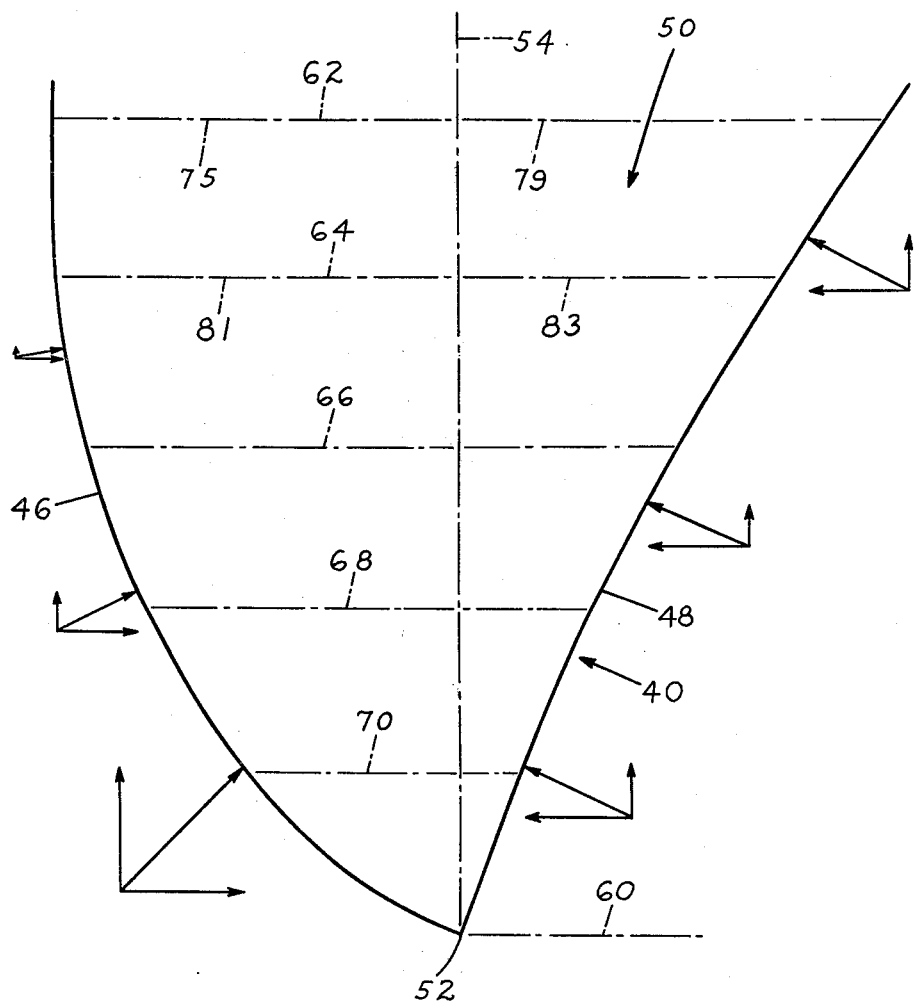
FIG. 8 is an enlarged sectional view of the wedge formed by the flanks of the cup-point of the instant invention.

As best seen in FIG. 8, in plane 62, passing through wedge 50 parallel to plane 60 and spaced from plane 60 a distance, taking into account customary production tolerances, 20% of the diameter of the cup-point opening, the width or thickness of wedge 50 between outer flank 46 and center line 54 passing through edge 52 and parallel to center line 44 is substantially equal to the width or thickness between inner flank 48 and center line 54. The thickness of wedge 50 in plane 62 is 20% of the cup diameter. Thus, the thickness of the portion of wedge 50 at the opposite sides of wedge center line 54 is 10% of the cup diameter.

From the inner end of plane 62, inner cup flank 48 slopes downwardly and outwardly to cup-point 52. Inner cup flank 48 may be straight or, as already noted, may curve slightly inwardly to form a slightly concave surface relative to center line 44. In the instant invention, where inner cup flank 48 curves inwardly, it has been found to be desirable to curve inner cup flank inwardly along a parabolic path traced by the formula $y = x^2$ where, at edge 52, or the cup point, $x$ is equaled to the radius of the cup and $y = x$. From that point $y$ is measured along center line 44, the vertex of the parabola and edge 52 being equidistant from the intersection of the $y$ axis of the parabola with plane 60. Taking the distance as 1, in the general parabolic curve equation, $y = 4ax^2$, $a$ is equal to ¼. Hence, for the parabolic shape of the inner cup flank, the curve equation becomes $y=4/4 \times x^2$ or $y=x^2$. The $x$ and $y$ values are calculated from the formula and scaled to the cup opening dimension so as to provide fasteners with required standard cup openings.

In parallel planes 70, 68, 66 and 64 spaced progressively from plane 60 at distances 20% of the distance between planes 60, 62 and parallel to such planes, the ratio of the distance between inner flank 48 and center line 54 to the distance between outer flank 46 and center line 54 is 20% greater in each plane than in the next lower plane going from plane 62 to plane 70. For example, the ratio of distance 79 to 75 in plane 62 is 20% greater than the ratio 83 82 to 81 in plane 64. Thus, the thickness of the section of the wedge to the outside of center line 54 decreases in relation to the thickness of the section of the wedge to the inside of center line 54 in the direction of penetration as wedge 50 increases in thickness. The rate of curvature of outer flank 46, from plane 62 downwardly is thus established by the slope of inner flank 48 relative to center line 54 and the ratio of the wedge thicknesses at each of planes 62, 64, 66, 68 and 70. Above plane 62, outer flank 46 extends substantially vertically along a line substantially parallel to center lines 44, 54 and merges with chamfer 47, joining flank 46 and the outer surface of the cup-point with the outer or circumferential wall of the pin or screw, as best shown in FIGS. 4 and 5.

The angle of curvature of outer flank 46 and the slope of inner flank 48 relative to wedge center line 54 in the cup-point fastener of the instant invention is of particular importance. As can best be seen in FIG. 8 of the attached drawings, the reaction forces applied normal to the curved surface of outer flank 46 of the cup-point, as such point progressively enters and penetrates the metal surface of one of the members being attached to another, progressively decrease. On inner flank 48 such reaction forces remain relatively constant. However, as can be seen in FIG. 8, the volume of metal displayed by outer flank 6 side of wedge 50, relative to center line 54 is greater than the volume displaced by inner flank 48 side of wedge 50. Because the greater volume of metal is displaced or caused to cold flow on the outside, rather than the inside of the cup-point and because, on outer flank 46, the reaction forces applied normal to the cup-point decrease as the cup-point progressively penetrates, deeper penetration, with equally applied penetrating force, can be attained than with the standard or modified standard cup-point.

While the reaction vector forces in the cup-point of the instant invention substantially decrease on outer flank 46 and remain substantially constant on inner flank 48, as the cup-point penetrates, it is to be noted that, at point 52 end of wedge 50, the reaction forces are substantially balanced at the opposite sides of wedge 50. This reaction force balancing is of substantial importannce because it tends to prevent the pointed edge of wedge 50 from mushrooming inwardly or outwardly. Hence, the line of entry of point 52 into the surface of the member being fastened is maintained in a substantially straight line. Such is not the case if mushrooming occurs.

In the use of the instant invention it will also be found that the external side of the wedge, line 46, is more nearly perpendicular to the line of applied force from the service load, when at full penetration. In prior arts this external side of the wedge is at an angle to this applied load such that a large component force of the service load is exerted in the direction of the fastener axis, thus increasing the load that forces the assembled members to separate. In many instances where the collar is made of a softer material, such as die cast zinc, this additional load along the axis causes the threads and/or collar to deform, loosening the assembly. The external side of the present invention, being perpendicular or nearly perpendicular to the direction of the service load will reduce or eliminate this component force.

It has also been found in actual use that the instant invention is less detrimentally effected by reuses than the 60° wedge cup and similarly shaped cups. This is because of the mushrooming which can result when these sharper linear angle wedge points are used on round shafting and which worsens with resuses.

As has been noted, the cup-point of the instant invention may be used as a threaded set-screw or as an unthreaded pin. As an unthreaded pin, the point may be pressed or driven through a suitable hole in one of the members to be fastened into the surface of the other member. Because of the depth of penetration that can be attained with such cup-point, for uses with some materials, an unthreaded pin affords sufficient fastening action.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A fastener pin having a cylindrical body portion for engaging the wall of a bore extending through a first member and having a cup-point at one of its ends integrally formed therein for engagement with and penetration into the surface of a second member for preventing relative movement between said members when said fastener pin is inserted through said bore and is in engagement with and penetrating into said surface, said cup-point having an outer flank continuously curving downwardly and inwardly and an inner flank continuously sloping downwardly and outwardly which meet and terminate in a surface engaging and penetrating edge extending circularly around and spaced radially outwardly from the vertical axis of said pin, said curving outer flank and said inner flank forming therebetween a wedge extending upwardly from said edge, said wedge progressively increasing in thickness upwardly from said edge, the ratio of the thickness of the inner wedge segment to the thickness of the outer wedge segment, when said wedge is divided by a line parallel to the pin axis and passing through the inner and outer flank intersection point, increasing by about 20% when measured in planes parallel to the plane of said edge at intervals of 20% between said plane of said edge and a plane parallel to said edge at a distance from said edge plane about 20% of the diameter of said cavity opening when measured beginning at said surface engaging and penetrating edge, the thickness of the inner and outer wedge segments in said plane at a distance from said edge plane of about 20% being substantially equal and the combined thickness of said segments being substantially equal to the distance of said plane from said edge plane.

2. A fastener pin as recited in claim 1 in which said curving outer flank merges with a wall tapering outwardly from said curving outer flank and merging at its opposite end with the outer wall of said fastener pin.

3. A fasterer pin as recited in claim 1 in which said outer wall of said fastener pin is threaded.

4. A fastener pin as recited in claim 1 in which said sloping inner flank of said cup-point curves along a parabolic path defined by the formula $y = x^2$, where the distance from the vertex of the parabola to the plane of said cavity opening measured along said vertical axis of said pin and $x$ are equal and the $x$ and $y$ values are calculated and scaled to a standard cup opening dimension so as to provide a fastener with such standard opening.

5. A fastener pin as recited in claim 4 in which said inner flank forms a hollow cavity extending upwardly from said edge and circularly around said vertical axis, the depth of said cavity being not substantially less than 0.25 of the diameter of the cavity opening at said edge, said outer flank extending upwardly and outwardly from said edge and circularly around said vertical axis, the curve blending to a surface approximately parallel to the fastener axis, at a point not substantially less than 0.25 of the diameter of the cup.

6. A fastener pin as recited in claim 5 in which said curving outer flank merges with a wall tapering outwardly from said curving outer flank and merging at its opposite end with the outer wall of said fastener pin.

7. A fastener pin as recited in claim 6 in which said outer wall of said fastener pin is threaded.

* * * * *